(12) United States Patent
Paatero

(10) Patent No.: US 7,684,222 B2
(45) Date of Patent: Mar. 23, 2010

(54) POWER CONVERSION APPARATUS WITH DC BUS PRECHARGE CIRCUITS AND METHODS OF OPERATION THEREOF

(75) Inventor: Esa Paatero, Helsinki (FI)

(73) Assignee: Eaton Corporation, Cleveland, OH (US)

( * ) Notice: Subject to any disclaimer, the term of this patent is extended or adjusted under 35 U.S.C. 154(b) by 1174 days.

(21) Appl. No.: 10/808,007

(22) Filed: Mar. 24, 2004

(65) Prior Publication Data

US 2005/0213357 A1 Sep. 29, 2005

(51) Int. Cl.
*H02M 7/44* (2006.01)
(52) U.S. Cl. .................................. 363/132; 363/123
(58) Field of Classification Search ............ 363/17–19, 363/37, 34, 98, 132, 123, 56; 323/222, 207, 323/266–272; 307/64–66, 43, 46, 80, 85
See application file for complete search history.

(56) References Cited

U.S. PATENT DOCUMENTS

| | | | | |
|---|---|---|---|---|
| 5,519,306 A | * | 5/1996 | Itoh et al. | 323/222 |
| 6,118,676 A | * | 9/2000 | Divan et al. | 363/34 |
| 6,222,352 B1 | * | 4/2001 | Lenk | 323/267 |
| 6,239,407 B1 | * | 5/2001 | Thommes | 219/130.21 |
| 6,329,636 B1 | * | 12/2001 | Geissler | 219/130.1 |
| 6,483,730 B2 | * | 11/2002 | Johnson, Jr. | 363/123 |
| 6,819,576 B2 | * | 11/2004 | Johnson, Jr. | 363/123 |
| 2002/0109412 A1 | | 8/2002 | Johnson, Jr. | |
| 2002/0118556 A1 | | 8/2002 | Johnson, Jr. | |

OTHER PUBLICATIONS

International Search Report and Written Opinion of the International Searching Authority for PCT/US2005/008369 mailed on Sep. 27, 2005.

\* cited by examiner

*Primary Examiner*—Rajnikant B Patel
(74) *Attorney, Agent, or Firm*—Myers Bigel Sibley & Sajovec, P.A.

(57) ABSTRACT

A power conversion apparatus, such as a UPS, includes a DC link including first and second DC busses and a reference bus and a DC generator circuit coupled to the DC link and operative to generate first and second DC voltages with respect to the reference bus on respective ones of the first and second DC busses. The apparatus further includes a precharge circuit coupled to the DC link and operative to charge a first capacitance between the first DC bus and the reference bus and to transfer charge from the charged first capacitance to a second capacitance between the second DC bus and the reference bus. The DC generator circuit may be operative to commence generation of the first and second DC voltages on the first and second DC busses after the precharge circuit precharges the first and second DC busses. Related operating methods are also discussed.

48 Claims, 4 Drawing Sheets

POWER CONVERSION APPARATUS WITH DC BUS PRECHARGE CIRCUITS AND METHODS OF OPERATION THEREOF

BACKGROUND OF THE INVENTION

The present invention relates to power conversion apparatus and methods, and more particularly, to power conversion apparatus including a DC bus and methods of operation thereof.

Uninterruptible power supplies (UPSs) and related power conversion apparatus often include a rectifier or other circuit that is used to generate a DC voltage at a DC output or link. For example, many UPSs use a configuration including an input rectifier circuit that receives an AC voltage from an AC power supply (e.g., an AC utility line) and that generates positive and negative DC voltages on a DC link including one or more busses (or "rails"). This DC voltage may be used to directly power loads (e.g., telecommunications equipment) or may be converted to AC by an inverter. In many such UPSs, an auxiliary DC power source, such as a battery coupled to the busses through a battery converter circuit, generates DC voltages on the busses in the event the AC power source fails and/or is degraded in quality.

A typical UPS includes one or more storage capacitors coupled to the DC link. Some on-line UPSs use a boost rectifier, which allows the DC voltage on the DC link to be boosted to levels greater than the peak AC input voltage. However, a potential problem With using such a boost rectifier in combination with a large storage capacitance is that undesirably large inrush currents may be produced when the rectifier is coupled to an AC source. In particular, in a boost mode converter, the DC link storage capacitors may initially act as a short-circuited load to the utility through the boost converter.

A precharge system may be used to pre-charge the DC bus to a voltage close to or preferably above the utility peak voltage prior to closure of utility disconnect device. Common approaches include using a power resistor that is coupled to the DC link with or without a series control device, such as a relay, to precharge the DC bus from the AC source. However, conventional precharge techniques may provide a long and/or difficult to scale pre-charge time or, conversely, may require the use of components that are bulky and expensive and may not be economical to assemble.

SUMMARY OF THE INVENTION

In some embodiments of the invention, a power conversion apparatus, such as a UPS, includes a DC link including first and second DC busses and a reference bus. The apparatus further includes a DC generator circuit coupled to the DC link and operative to generate first and second DC voltages with respect to the reference bus on respective ones of the first and second DC busses. The apparatus further includes a precharge circuit coupled to the DC link and operative to charge a first capacitance between the first DC bus and the reference bus and to transfer charge from the charged first capacitance to a second capacitance between the second DC bus and the reference bus. The DC generator circuit may be operative to commence generation of the first and second DC voltages on the first and second DC busses after the precharge circuit precharges the first and second DC busses.

In some embodiments of the invention, the precharge circuit includes a precharge converter circuit, e.g., a buck converter circuit, operative to charge the first capacitance from an AC source and/or a DC source and a balancer circuit operative to transfer charge between the first and second capacitances. The balancer circuit may be operative to selectively couple the first and second DC busses to the reference bus via an inductor.

In further embodiments, the DC generator circuit and the balancer circuit include a common half-bridge circuit. In some embodiments., the common half-bridge circuit may be configurable to operate as a rectifier circuit in a first mode of operation and as a balancer circuit in a second mode of operation.

According to further aspects of the inventions, the precharge circuit is operative to charge the first capacitance to increase a voltage between the first DC bus and the reference bus to a first voltage and to initiate charge transfer to the second capacitance after the voltage between the first DC bus and the reference bus reaches the first voltage. The precharge circuit may be further operative to terminate charge transfer to the second capacitance after a voltage between the second DC bus and the reference bus reaches a second voltage. The DC generator circuit may be operative to generate the first and second DC voltages on the first and second DC busses from an AC source, and the second voltage may be greater than a peak voltage of the AC source. The precharge circuit may be further operative to initiate charge transfer from the charged second capacitance to the first capacitance to further boost the voltage between the first DC bus and the reference bus.

In additional embodiments, a power conversion apparatus includes a DC link including first and second DC busses and a reference bus, a boost converter circuit coupled to the DC link and operative to generate first and second DC voltages with respect to the reference bus on respective ones of the first and second DC busses from an AC source and/or a DC source, and a precharge circuit coupled to the DC link and operative to charge a first capacitance between the first DC bus and the reference bus and to transfer charge from the charged first capacitance to a second capacitance between the second DC bus and the reference bus. The boost converter circuit may be operative to commence generation of the first and second DC voltages on the first and second DC busses after the precharge circuit precharges the first and second DC busses. The precharge circuit may include a buck converter circuit operative to charge the first capacitance and a balancer circuit operative to transfer charge between the first and second capacitances. The boost converter circuit and the balancer circuit may include a common half-bridge circuit, which may be configurable to operate as a boost rectifier circuit in a first mode of operation and as a balancer circuit in a second mode of operation.

In further embodiments of the invention, a UPS includes a DC link including first and second DC busses and a reference bus. The UPS further includes a DC generator circuit coupled to the DC link and operative to generate first and second DC voltages with respect to the reference bus on respective ones of the first and second DC busses from either or both of a first power source and a second power source. A precharge circuit is coupled to the DC link and is operative to charge a first capacitance between the first DC bus and the reference bus and to transfer charge from the charged first capacitance to a second capacitance between the second DC bus and the reference bus.

According to some method embodiments of the invention, a power converter including a DC link including first and second DC busses and a reference bus and a DC generator circuit coupled to the DC link and operative to generate first and second DC voltages with respect to the reference bus on respective ones of the first and second DC busses is operated by charging a first capacitance between the first DC bus and the reference bus, transferring charge from the charged first capacitance to a second capacitance between the second DC bus and the reference bus to charge the second capacitance, and then generating the first and second DC voltages on the first and second DC busses using the DC generator circuit. The first capacitance may be charged using a buck converter circuit coupled to an AC source and/or a DC source. Charge may be transferred between the first and second capacitances using a balancer circuit.

DETAILED DESCRIPTION OF EXEMPLARY EMBODIMENTS

Figure 1:
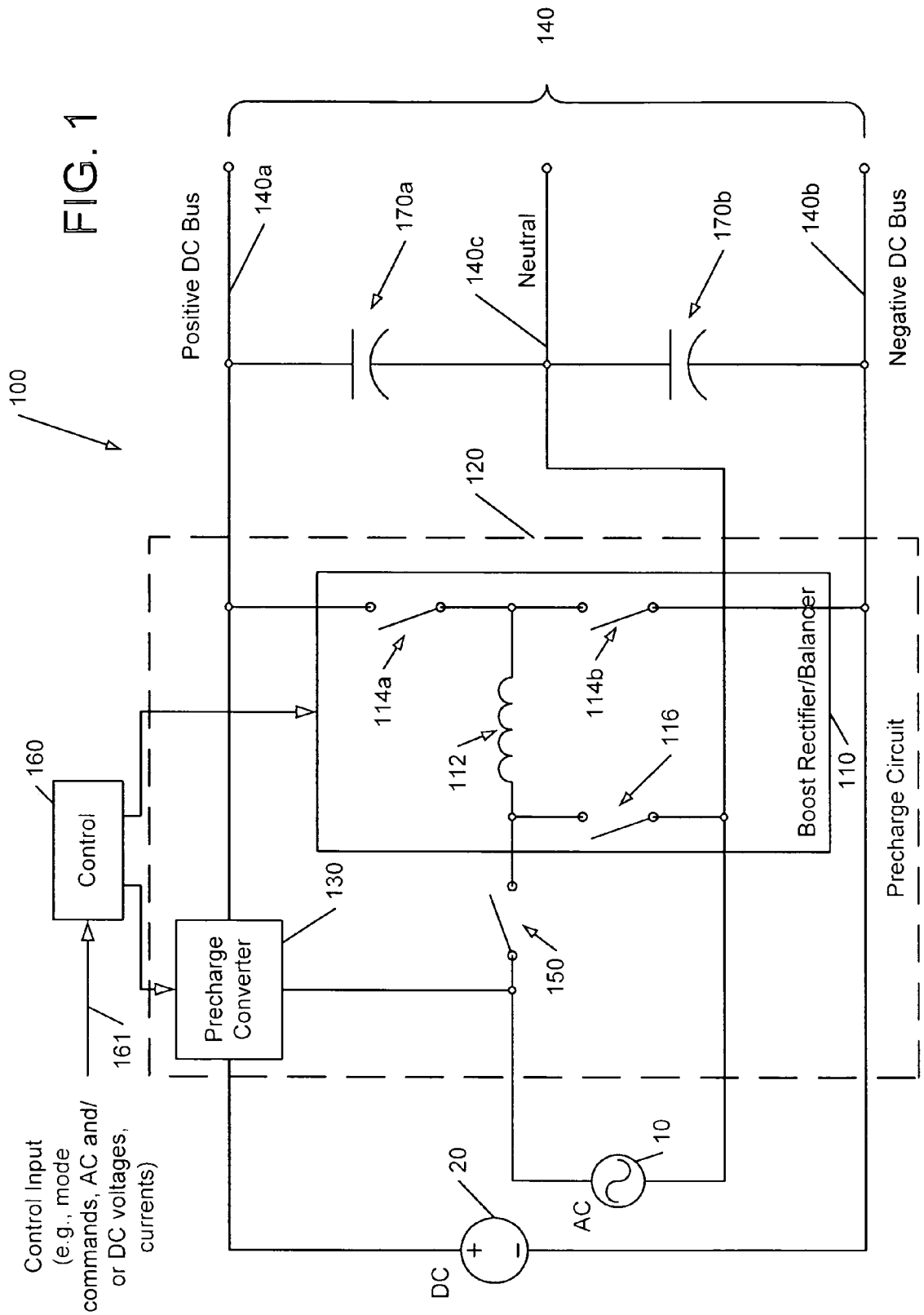
FIG. 1 is a schematic diagram of a power conversion apparatus according to some embodiments of the invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present.

FIGS. 1-5 are schematic diagrams and waveform diagrams illustrating exemplary apparatus and methods according to various embodiments of the present invention. The items in these figures, and combinations thereof, may be implemented using one or more electronic circuits, for example, power electronics circuits, such as half-bridge circuits and drive circuits therefor controlled by a processor, such as a microprocessor or microcontroller. It will also be appreciated that, in general, operations depicted in the diagrams, and combinations thereof, may be implemented in one or more electronic circuits, such as in one or more discrete electronic components, one or more integrated circuits (ICs), one or more application specific integrated circuits (ASICs), and application specific circuit modules, as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the specified operations. The computer program instructions may also be executed on one or more computers or other data processing apparatus to cause a series of actions to be performed by the computer(s) or other programmable apparatus to produce a computer implemented process that includes the specified operations. Accordingly, the block diagrams support electronic circuits and other apparatus that perform the specified operations, and acts for performing the specified operations. It will be appreciated that the blocks may represent functional groupings of circuitry and that, even if separate functional blocks are illustrated, the same circuitry may be used in implementing the functions of the separate blocks.

FIG. 1 illustrates a power conversion apparatus 100 according to some embodiments of the present invention. The apparatus 100, which may be incorporated in an AC or DC uninterruptible power supply (UPS), for example, includes a DC generator circuit in the form of a boost rectifier/balancer circuit 110 having an input configured to be coupled to an AC source 10 via an AC input switch 150 and an output coupled to a DC link 140 including first and second DC busses 140a, 140b and a neutral (reference) bus 140c. The apparatus 100 further includes a precharge circuit 120, here shown as including the rectifier/balancer circuit 110 and a precharge converter circuit 130 that are configured to act in concert to precharge the first and second DC busses 140a, 140b, and more particularly, to precharge first and second capacitances 170a, 170b (i.e., storage capacitors incorporated in the apparatus 100 and/or capacitive loads connected to the DC link 140) coupled between respective ones of the first and second DC busses 140a, 140b and the neutral bus 140c. A control circuit 160 controls the rectifier/balancer circuit 110 and the precharge circuit 120 responsive to one or more control inputs 161, which may include operational variables of the apparatus 100, such as AC and/or DC voltages and/or currents, and/or operating commands, such as commands for placing the apparatus 100 in various operating modes. It will be understood that the control circuit 160 may be implemented using analog circuitry, digital circuitry (e.g., a microprocessor or microcontroller) and combinations thereof.

The rectifier/balancer circuit 110 includes an inductor 112, first and second switches (e.g., insulated gate bipolar transistors (IGBTs) or other semiconductor switching devices) 114a, 114b connected in a half-bridge configuration, and a third switch 116 operative to couple the inductor 112 to the neutral bus 140c. When operating in a "normal" mode, the control circuit 160 can cause the boost rectifier/balancer circuit 110 to act as a rectifier, i.e., the DC link 140 may be powered from the AC source 10 by closing a switch 150 and operating the switches 114a, 114b to produce positive and negative voltages on respective ones of the first and second DC busses 140a, 140b with respect to the neutral bus 140c.

In a precharge mode of operation, the control circuit 160 causes the precharge converter circuit 130 to charge the first capacitance 170a and the rectifier/balancer circuit 110 to act as a balancer circuit that transfers charge between the first and second capacitances 170a, 170b. In particular, the precharge converter circuit 130 may charge the first capacitance 170a from and AC source 10 and/or a DC source 20, which may be, for example, a battery (or a combination of a battery and a battery converter circuit) that is also used to provide auxiliary or secondary power to the DC link 140. The control circuit 160 may operate the rectifier/balancer circuit 110 as a balancer circuit by closing the switch 116 (while the AC input switch 150 is open) and selectively operating the switches 114a, 114b to cause charge to be transferred between the first and second capacitances 170a, 170b. Exemplary uses of a balancer circuit to control relative voltages of DC busses in a power converter by such charge transfer are described in U.S. Pat. No. 6,314,007 to Johnson and in copending U.S. patent application Ser. No. 10/106,943 to Johnson, filed Mar. 25, 2002, the disclosures of which are incorporated herein by reference in their entireties.

The circuit implementation illustrated in FIG. 1 may be particularly advantageous in some converter applications, such as in a UPS. In particular, a configuration such as that illustrated in FIG. 1 may provide efficient utilization of circuitry by using a main circuit element, e.g., an input rectifier, to perform part of the DC bus precharge operation, e.g., transferring charge between DC busses. This can, for example, obviate the need to provide separate precharge circuits for positive and negative DC busses. In addition, embodiments of the invention can take advantage of the boost capability of an input rectifier to precharge DC busses nearer a desired operating level, as discussed in detail below with reference to FIG. 3.

Figure 2:
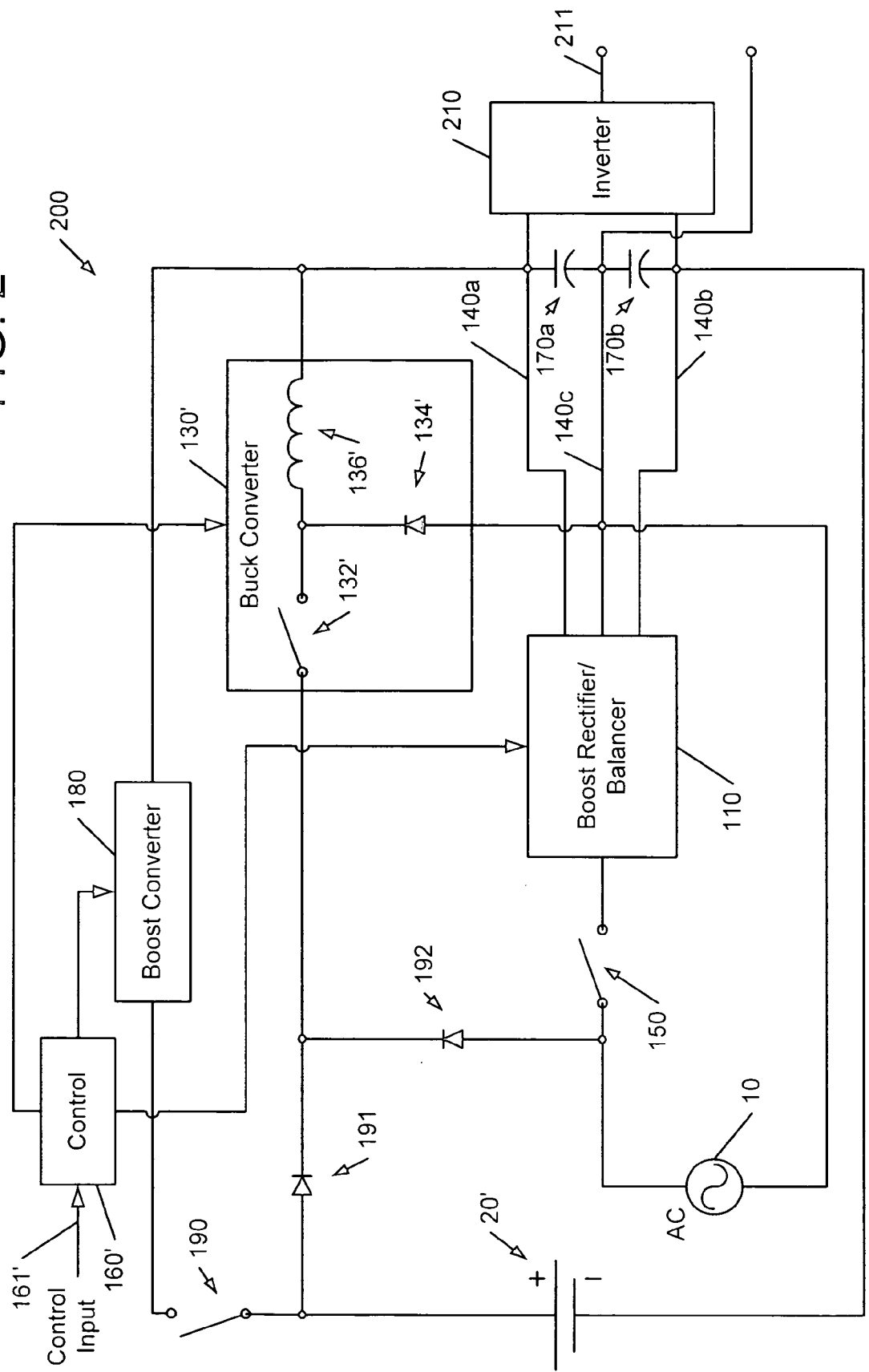
FIG. 2 is a schematic diagram of a power conversion apparatus according to further embodiments of the invention.

It will be appreciated that the implementation provided in FIG. 1 is exemplary, and that other circuit configurations fall within the scope of the invention. For example, although FIG. 1 illustrates a rectifier/balancer circuit 110 that uses a common half-bridge circuit to perform DC generation (e.g., rectification) and charge transfer functions as described above, the invention may also be implemented using, for example, separate rectifier and balancer circuits. For example, a separate half-bridge circuit could be provided for the above-described balancer operations. It will be further understood that the circuitry shown in FIG. 1 can be implemented in a complementary form, e.g., by using a precharge converter circuit that charges the second capacitance 170b, and operating the balancer circuit such that charge is transferred from the second capacitance 170b to the first capacitance 170a. Although FIG. 1 illustrates an implementation for a single AC phase, the invention is applicable to multi-phase power converter apparatus, for example, in a three-phase UPS. It will also be appreciated that the invention may be used in various different types of power conversion apparatus, including, but not limited to, DC power supplies and UPSs FIG. 2 illustrates a power conversion apparatus, in particular, a UPS 200, according to further embodiments of the invention. The UPS 200 includes first and second DC busses 140a, 140b, a neutral bus 140c, a rectifier/balancer circuit 110 configured to be coupled to an AC source 10 by an AC input switch 150, DC link capacitances 170a, 170b, and an inverter 210 that produces an AC output 211 with respect to the neutral bus 140c from DC voltages on the first and second DC busses 140a, 140b. The UPS 200 further includes a precharge converter circuit in the form of a precharge buck converter circuit 130' including an input current interrupting switch (e.g., transistor) 132', an inductor 136', and a diode 134'. The precharge buck converter circuit 130' is coupled to the AC source 10 by a diode 191 and to a DC source (battery) 20' by a diode 192, and is capable of precharging the DC busses 140a, 140b from either the AC source 10 or the DC source 20'. The DC source 20' may also be coupled to a battery converter, e.g., a boost converter circuit 180, using a DC input switch 190 to provide battery-powered operation of the UPS 200. A control circuit 160' controls the precharge buck converter circuit 130' the rectifier/balancer circuit 110, the battery converter circuit 180, and the AC and DC input switches 150, 190 responsive to one or more control inputs 161'.

Figure 3:
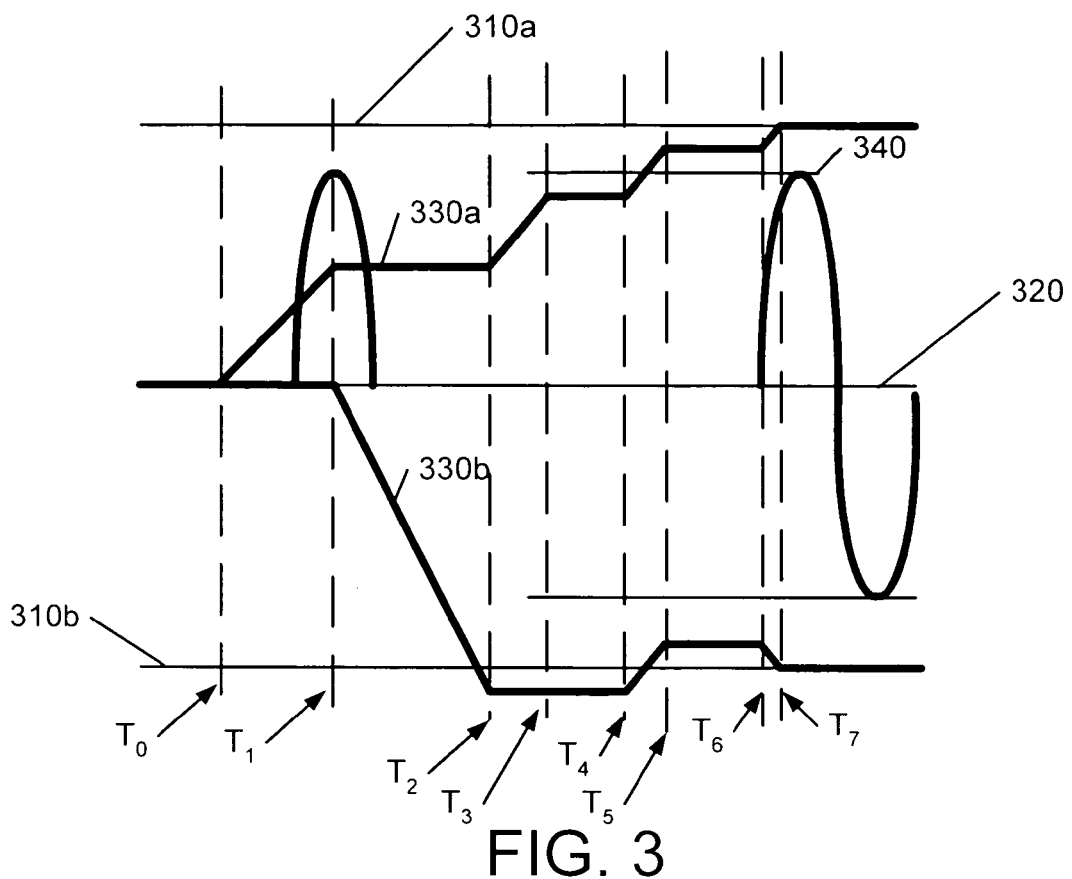
FIGS. 3-5 are waveform diagrams illustrating exemplary DC bus precharge operations for the power conversion apparatus of FIG. 2 according to various embodiments of the invention.

FIG. 3 illustrates exemplary operations for precharging the DC busses 140a, 140b of the UPS 200 from the AC source 10. Prior to a time $T_0$, the control circuit 160' configures the rectifier/balancer circuit 110 as balancer circuit (i.e., the AC input switch 150 is open). Responsive to receipt of a turn-on command, the control circuit 160' causes the precharge buck converter circuit 130' to start charging the first capacitance 170a from the AC source 10 at time $T_0$, which causes the voltage 330a on the first DC bus 140a to increase. At a subsequent time $T_1$, the control circuit 160' causes the rectifier/balancer circuit 110 to begin transferring charge to the second capacitance 170b while the precharge buck converter circuit 130' continues to charge the first capacitance 170a, thus driving the voltage 330b on the second DC bus 140b more negative (i.e., negative boosting). The appropriate DC level at which this charge transfer phase begins may be determined by the phase configuration of the unit. For example, for a single phase utility input as shown in FIG. 2, it may be advantageous to start charge transfer at around half the peak voltage of the AC source, as the precharge buck converter circuit 130' operates in buck mode and, therefore, generally requires an input voltage higher than its output voltage. The rate of charge of the second capacitance 170b is generally dependent on the duty cycle of the balancer circuit 110.

At a time $T_2$, the second DC bus 140b reaches a magnitude that is greater than a desired or target magnitude 310b for the second DC bus 140b, and the balancer operation of the rectifier/balancer circuit 110 is terminated. The precharge buck converter circuit 130' continues to charge the first DC bus 140a until it reaches a predetermined level (which may be the maximum that can be achieved by the precharge buck converter circuit 130') at a time $T_3$, at which time the precharge buck converter circuit 130' can be turned off. Assuming the capacitance 170b is sufficiently large and negligible leakage, the voltage on the second DC bus 140b remains relatively unchanged. At a time $T_4$, balancer operation of the rectifier/balancer circuit 110 is resumed, which causes charge transfer from the second capacitance 170b to the first capacitance 170a, thus boosting the voltage 330a on the first DC bus 140a above a peak voltage 340 of the AC input (and nearer a desired level 310a) and reducing the magnitude of the voltage 330b on the second DC bus 140a such that it is slightly less negative than the desired level 310b. At time $T_5$, balancer operation is terminated. Subsequently, at a time $T_6$, the control circuit 160' closes the AC input switch 150 and starts operating the rectifier/balancer circuit 110 as a rectifier, which brings the voltages 330a, 330b of the first and second DC busses 140a, 140b to desired levels at a time $T_7$. Because the voltages 330a, 330b on the first and second DC busses 140a, 140b have been gradually precharged to near the desired working levels 310a, 310b before closing the AC input switch 150, inrush current and/or voltage across the switch 150 can be limited to acceptable levels.

Figure 4:
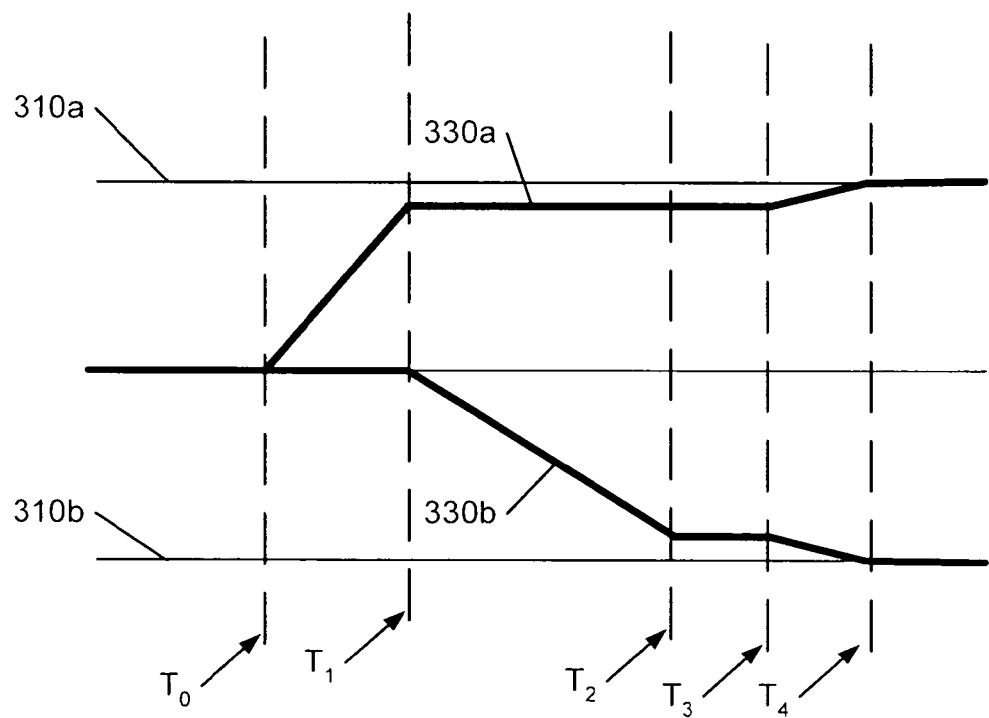

FIG. 4 illustrates exemplary precharge operations for the UPS 200 using the DC power source 20 when a magnitude of the voltage supplied by the battery 20' is greater than or equal to the magnitude of the desired voltage levels 310a, 310b for the first and second DC buses 140a, 140b with respect to the neutral bus 140c. Prior to time $T_0$, the control circuit 160' causes the rectifier/balancer circuit 110 to tie the second DC bus 140b to the neutral bus 140c (the AC input switch 150 and the DC input switch 190 are both open). At time $T_0$, the control circuit 160' causes the precharge buck converter circuit 130' to start charging the first capacitance 170a from the battery 20', thus causing the voltage 330a on the first DC bus 140a to increase. At a time $T_1$, the control circuit 160' causes the rectifier/balancer circuit 110 to begin balancer operation, transferring charge to the second capacitance 170b and causing the voltage 330b on the second DC bus 140b to become increasingly negative. The level at which balancer operation begins may be variable as a function of, for example, battery voltage/total DC link ratio. At a time $T_2$, the voltages 330a, 330b on the first and second busses reach levels acceptably near desired operating levels 310a, 310b. At a subsequent time $T_3$, the control circuit can close the DC input switch 190 with low inrush current and/or voltage across the switch 190, and use the battery boost converter circuit 180 and the rectifier/balancer circuit 110 to maintain the voltages on the DC busses 140a, 140b from the battery 20'. Alternatively, if acceptable AC power is available, the control circuit 160' can close the AC input switch 150 to couple the AC source 10 to the rectifier/balancer circuit 10 and begin driving the DC busses 140a, 140b from the AC source 10 with acceptably low inrush current and/or voltage across the switch 150.

Figure 5:
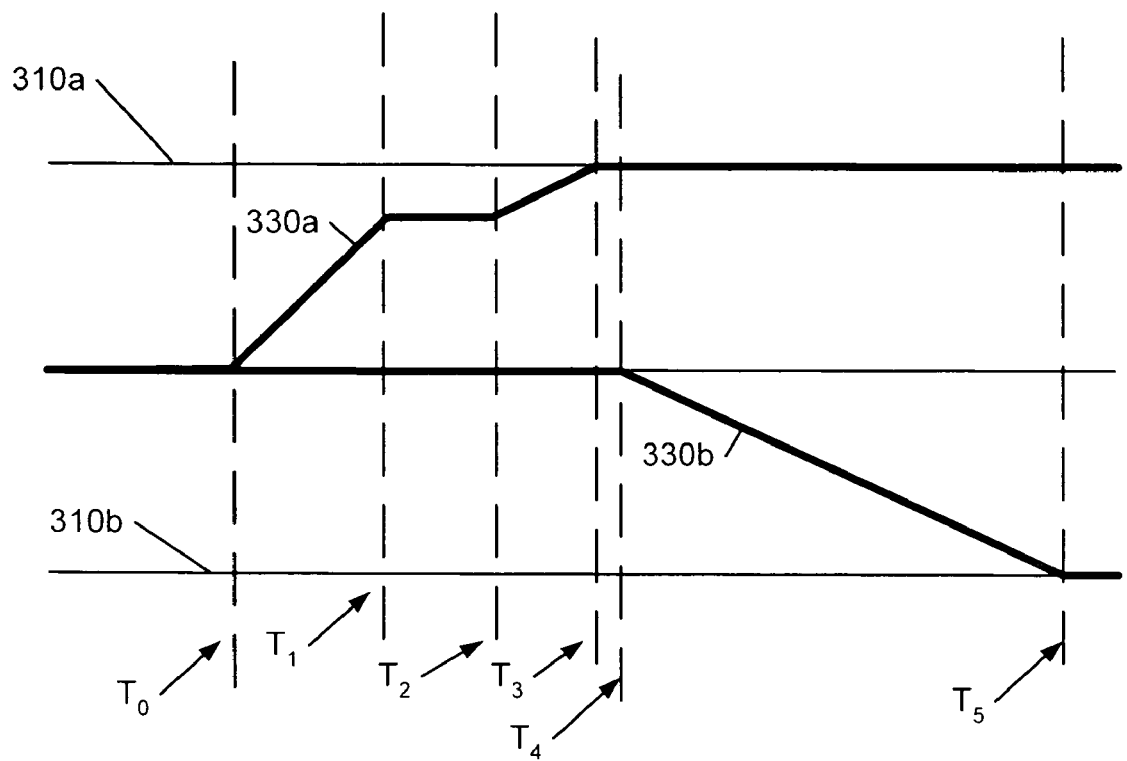

FIG. 5 illustrates exemplary precharge operations for the UPS 200 using the battery 20' when a magnitude of the voltage supplied by the battery 20' is less than the magnitude of desired levels 310a, 310b for the first and second DC buses 140a, 140b. Prior to time $T_0$, the control circuit 160' causes the rectifier/balancer circuit 110 to tie the second DC bus 140b to the neutral bus 140c (again, with the AC and DC input switches 150, 190 open). At a time $T_0$, the control circuit 160' causes the precharge buck converter circuit 130' to start charging the first capacitance 170a, thus causing the voltage 330a on the first DC bus 140a to increase until it is substantially equal to the voltage of the battery 20' at time $T_1$. At this time, the battery 20' can be coupled to the battery boost converter circuit 180 (by closing switch 190) without undue inrush current and/or with a relatively low voltage across the switch 190. At a time $T_2$, the battery boost converter circuit 180 is operated such that it further charges the first DC bus 140a to the desired level 310a. At a time $T_3$, the control circuit 160' starts operating the rectifier/balancer circuit 110 to begin charge transfer to the second capacitance 170b while the battery boost converter circuit 180 maintains the desired level 310a on the first DC bus 310a. At a time $T_5$, the second DC bus 140b reaches its desired level 310b. Subsequently, the UPS 200 may continue to use the rectifier/balancer circuit 110 and the battery boost converter circuit 180 to maintain desired DC voltages on the first and second DC busses 140a, 140b, or the UPS 200 may commence normal AC powered operation, e.g., the control circuit 160' can cause the rectifier/balancer circuit 110 to begin operating as a rectifier to maintain the DC voltages on the DC busses 140a, 140b from the AC source 10.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A power conversion apparatus comprising:
   a DC link comprising first and second DC busses and a reference bus;
   a DC generator circuit coupled to the DC link and operative to generate first and second DC voltages with respect to the reference bus on respective ones of the first and second DC busses; and
   a precharge circuit coupled to the DC link and operative to charge a first capacitance between the first DC bus and the reference bus and to transfer charge from the charged first capacitance to a second capacitance between the second DC bus and the reference bus.

2. An apparatus according to claim 1, wherein the DC generator circuit is operative to commence generation of the first and second DC voltages on the first and second DC busses after the precharge circuit precharges the first and second DC busses.

3. An apparatus according to claim 1, wherein the precharge circuit comprises:
   a precharge converter circuit operative to charge the first capacitance from an AC source and/or a DC source; and
   a balancer circuit operative to transfer charge between the first and second capacitances.

4. An apparatus according to claim 3, wherein the balancer circuit is operative to selectively couple the first and second DC busses to the reference bus via an inductor.

5. An apparatus according to claim 4, wherein the balancer circuit comprises:
   an inductor; and
   first and second switches operative to selectively couple respective ones of the first and second DC busses to the inductor.

6. An apparatus according to claim 5, further comprising a third switch operative to couple and decouple the inductor to and from the reference bus.

7. An apparatus according to claim 3, wherein the DC generator circuit and the balancer circuit include a common half-bridge circuit.

8. An apparatus according to claim 7, wherein the common half-bridge circuit is configurable to operate as a rectifier circuit in a first mode of operation and as a balancer circuit in a second mode of operation.

9. An apparatus according to claim 1, wherein the precharge circuit is operative to charge the first capacitance to increase a voltage between the first DC bus and the reference bus to a first voltage and to initiate charge transfer to the second capacitance after the voltage between the first DC bus and the reference bus reaches the first voltage.

10. An apparatus according to claim 9, wherein the precharge circuit is further operative to terminate charge transfer to the second capacitance after a voltage between the second DC bus and the reference bus reaches a second voltage.

11. An apparatus according to claim 10, wherein the DC generator circuit is operative to generate the first and second DC voltages on the first and second DC busses from an AC source, and wherein the second voltage is greater than a peak voltage of the AC source.

12. An apparatus according to claim 10, wherein the precharge circuit is further operative to initiate charge transfer from the charged second capacitance to the first capacitance to further boost the voltage between the first DC bus and the reference bus.

13. An apparatus according to claim 9, wherein the DC generator circuit is operative to commence generation of DC voltages on the first and second DC busses after the precharge circuit precharges the first and second capacitances.

14. An apparatus according to claim 9, wherein the precharge circuit comprises:
   a buck converter circuit operative to charge the first capacitance from an AC power source and/or a DC power source
   a balancer circuit operative to transfer charge between the first and second capacitances; and
   a control circuit coupled to the buck converter circuit and to the balancer circuit, the control circuit operative to cause the buck converter circuit to charge the first capacitance to increase the voltage between the first DC bus and the reference bus to the first voltage and to cause the balancer circuit to transfer charge from the charged first capacitance to the second capacitance after the voltage between the first DC bus and the reference voltage reaches the first voltage.

15. An apparatus according to claim 1, wherein the DC generator circuit comprises a boost converter circuit.

16. An apparatus according to claim 1, wherein the DC generator circuit is operative to generate the first and second DC voltages on the first and second DC busses from an AC power source and/or a DC power source.

17. An apparatus according to claim 1, wherein the precharge circuit is operative to charge the first capacitance from an AC power source and/or a DC power source.

18. An apparatus according to claim 1, further comprising first and second storage capacitors coupled between respective ones of the first and second DC busses and the reference bus, and wherein the first and second capacitances comprise respective ones of the first and second storage capacitors.

19. A power conversion apparatus comprising:
a DC bus;
a buck converter circuit coupled to the DC bus and operative to charge a capacitance coupled to the DC bus; and
a boost converter circuit coupled to the DC bus and operative to commence generating a DC voltage on the DC bus from an AC source and/or a DC source after the buck converter circuit precharges the DC bus.

20. A power conversion apparatus, comprising:
a DC link comprising first and second DC busses and a reference bus;
a boost converter circuit coupled to the DC link and operative to generate first and second DC voltages with respect to the reference bus on respective ones of the first and second DC busses from an AC source and/or a DC source; and
a precharge circuit coupled to the DC link and operative to charge a first capacitance between the first DC bus and the reference bus and to transfer charge from the charged first capacitance to a second capacitance between the second DC bus and the reference bus.

21. An apparatus according to claim 20, wherein the boost converter circuit is operative to commence generation of the first and second DC voltages on the first and second DC busses after the precharge circuit precharges the first and second DC busses.

22. An apparatus according to claim 20, wherein the precharge circuit comprises:
a buck converter circuit operative to charge the first capacitance; and
a balancer circuit operative to transfer charge between the first and second capacitances.

23. An apparatus according to claim 22, wherein the boost converter circuit and the balancer circuit include a common half-bridge circuit.

24. An apparatus according to claim 23, wherein the common half-bridge circuit is configurable to operate as a boost rectifier circuit in a first mode of operation and as a balancer circuit in a second mode of operation.

25. An uninterruptible power supply (UPS) comprising:
a DC link comprising first and second DC busses and a reference bus;
a DC generator circuit coupled to the DC link and operative to generate first and second DC voltages with respect to the reference bus on respective ones of the first and second DC busses from either or both of a first power source and a second power source; and
a precharge circuit coupled to the DC link and operative to charge a first capacitance between the first DC bus and the reference bus and to transfer charge from the charged first capacitance to a second capacitance between the second DC bus and the reference bus.

26. A UPS according to claim 25, wherein the DC generator circuit is operative to commence generation of the first and second DC voltages on the first and second DC busses after the precharge circuit precharges the first and second DC busses.

27. A UPS according to claim 25, wherein the precharge circuit comprises:
a precharge converter circuit operative to charge the first capacitance from an AC source and/or a DC source; and
a balancer circuit operative to transfer charge between the first and second capacitances.

28. A UPS according to claim 27, wherein the DC generator circuit comprises a boost converter circuit and wherein the precharge converter circuit comprises a buck converter circuit.

29. A UPS according to claim 27, wherein the DC generator circuit and the balancer circuit include a common half-bridge circuit.

30. A UPS according to claim 29, wherein the common half-bridge circuit is configurable to operate as a rectifier circuit in a first mode of operation and as a balancer circuit in a second mode of operation.

31. A UPS according to claim 25, wherein precharge circuit is operative to charge the first capacitance to increase a voltage between the first DC bus and the reference bus to a first voltage and to initiate charge transfer to the second capacitance after the voltage between the first DC bus and the reference bus reaches the first voltage.

32. A UPS according to claim 31, wherein the precharge circuit is further operative to terminate charge transfer to the second capacitance after a voltage between the second DC bus and the reference bus reaches a second voltage.

33. A UPS according to claim 32, wherein the DC generator circuit is operative to generate the first and second DC voltages on the first and second DC busses from an AC source, and wherein the second voltage is greater than a peak voltage of the AC source.

34. A UPS according to claim 32, wherein the precharge circuit is further operative to initiate charge transfer from the charged second capacitance to the first capacitance to further boost the voltage between the first DC bus and the reference bus.

35. A UPS according to claim )5 wherein the precharge circuit is operative to charge the first capacitance from the first power source and/or the second power source.

36. A UPS according to claim 25, wherein the first power source comprises an AC power source and wherein the second power source comprises a DC power source.

37. A UPS according to claim 36, wherein the DC power source comprises a battery.

38. A UPS according to claim 25, further comprising first and second storage capacitors coupled between respective ones of the first and second DC busses and the reference bus, and wherein the first and second capacitances comprise respective ones of the first and second storage capacitors.

39. A UPS according to claim 25, further comprising a DC/AC converter circuit coupled to the DC link and operative to generate an AC voltage from the first and second DC voltages.

40. A method of operating a power converter including a DC link comprising first and second DC busses and a reference bus and a DC generator circuit coupled to the DC link and operative to generate first and second DC voltages with respect to the reference bus on respective ones of the first and second DC busses, the method comprising:
charging a first capacitance between the first DC bus and the reference bus
transferring charge from the charged first capacitance to a second capacitance between the second DC bus and the reference bus to charge the second capacitance and then generating the first and second DC voltages on the first and second DC busses using the DC generator circuit.

41. A method according to claim 40:
- wherein charging a first capacitance comprises charging the first capacitance using a buck converter circuit coupled to an AC source and/or a DC source; and
- wherein transferring charge comprises transferring charge using a balancer circuit.

42. A method according to claim 41, wherein the DC generator circuit and the balancer circuit include a common half-bridge circuit.

43. A method according to claim 42:
- wherein transferring charge transferring charge from the charged first capacitance to the second capacitance using a balancer circuit comprises transferring charge from the charged first capacitance using the common half-bridge circuit as a balancer circuit; and
- wherein generating the first and second DC voltages on the first and second DC busses using the DC generator circuit comprises generating the first and second DC voltages on the first and second DC busses using the common half-bridge circuit as a rectifier circuit.

44. A method according to claim 40:
- wherein charging the first capacitance comprises charging the first capacitance to increase a voltage between the first DC bus and the reference bus to a first voltage and
- wherein transferring charge from the charged first capacitance to a second capacitance between the second DC bus and the reference bus to charge the second capacitance comprises initiating charge transfer from the charged first capacitance to the second capacitance after the voltage between the first DC bus and the reference bus reaches the first voltage.

45. A method according to claim 44, further comprising terminating charge transfer from the first capacitance to the second capacitance after a voltage between the second DC bus and the reference bus reaches a second voltage.

46. A method according to claim 45, wherein generating the first and second DC voltages on the first and second DC busses using the DC generator circuit comprises generating the first and second DC voltages on the first and second DC busses from an AC source, and wherein the second voltage is greater than a peak voltage of the AC source.

47. A method according to claim 46, wherein generating the first and second DC voltages on the first and second DC busses using the DC generator circuit is preceded by transferring charge from the charged second capacitance to the first capacitance to further boost the voltage between the first DC bus and the reference bus.

48. A UPS comprising the power conversion apparatus of claim 1, wherein the DC generator circuit is operative to generate the first and second DC voltages from either or both of a first power source and a second power source.

* * * * *

UNITED STATES PATENT AND TRADEMARK OFFICE
CERTIFICATE OF CORRECTION

PATENT NO.        : 7,684,222 B2                                              Page 1 of 1
APPLICATION NO.   : 10/808007
DATED             : March 23, 2010
INVENTOR(S)       : Paatero It is certified that error appears in the above-identified patent and that said Letters Patent is hereby corrected as shown below:

Column 10, Claim 35, Line 38: Please correct "claim )5" to read -- claim 25 --
                Claim 40, Line 65: Please correct "capacitance and" to read
                                -- capacitance; and --

Column 11, Claim 44, Line 24: Please correct "voltage and" to read
                                  -- voltage; and --

Signed and Sealed this

Fifth Day of October, 2010

David J. Kappos
*Director of the United States Patent and Trademark Office*